United States Patent
Owen et al.

(10) Patent No.: US 7,122,788 B1
(45) Date of Patent: Oct. 17, 2006

(54) ADAPTIVELY REDUCING OFFSET IN A THERMAL IMAGING CAMERA

(75) Inventors: Robert A. Owen, Rowlett, TX (US); Vicki D. Paul, McKinney, TX (US); Humphrey W. Ha, Plano, TX (US); Roger C. Knott, Plano, TX (US); Mark A. Gohlke, Plano, TX (US); Charles M. Hanson, Richardson, TX (US)

(73) Assignee: L-3 Communications Corporation, New York, NY (US)

( * ) Notice: Subject to any disclaimer, the term of this patent is extended or adjusted under 35 U.S.C. 154(b) by 215 days.

(21) Appl. No.: 10/961,975

(22) Filed: Oct. 8, 2004

(51) Int. Cl.
*G01D 18/00* (2006.01)
(52) U.S. Cl. .................................................. 250/252.1
(58) Field of Classification Search ...................... None
See application file for complete search history.

(56) References Cited

U.S. PATENT DOCUMENTS 5,532,484 A * 7/1996 Sweetser et al. ............ 250/332
5,994,701 A * 11/1999 Tsuchimoto et al. ........ 250/351
6,353,223 B1 3/2002 Ookawa ..................... 250/330

OTHER PUBLICATIONS

"*Thermal-Eye 2500AS*", 2500AS-SEC/F/LE-0904, Raytheon Commercial Infrared, www.raytheoninfrared.com; 3 pages, Jul. 2004.

* cited by examiner

*Primary Examiner*—David Porta
*Assistant Examiner*—Mindy Vu
(74) *Attorney, Agent, or Firm*—O'Keefe, Egan & Peterman, LLP

(57) ABSTRACT

Collecting samples to adjust a signal includes providing a shutter in an opened position to allow a detector of an infrared camera to detect infrared radiation and generate a signal corresponding to the infrared radiation. A first touchup iteration is initiated by moving the shutter to a closed position, and samples of a reference frame are collected according to a collection instruction. The shutter is then moved to the opened position. If there is a change in a state of the infrared camera, the collection instruction is adjusted in response to the change. A second touchup iteration is initiated by moving the shutter to the closed position, and samples are collected according to the adjusted collection instruction. A modification of the signal is determined in accordance with at least some of the samples.

38 Claims, 2 Drawing Sheets

ADAPTIVELY REDUCING OFFSET IN A THERMAL IMAGING CAMERA

TECHNICAL FIELD

This invention relates generally to the field of infrared cameras and more specifically to adaptively reducing offset in a thermal imaging camera.

BACKGROUND

Infrared cameras detect infrared radiation emitted by the objects of a scene, and generate an image of the scene from the detected radiation. An infrared camera has a temperature detector that detects subtle temperature changes in the scene such as changes of less than one degree Fahrenheit. The detector may also be extremely sensitive to camera temperature changes that cause unintentional signal offsets.

The signal offsets may be subtracted from the signal. Typically, subtraction may be performed by factory calibration followed by real-time calibration. According to known techniques for real-time calibration, the detector may be blocked by a shutter in order to provide a constant reference from which samples may be collected. The samples may then be used to determine a signal offset. Dropping the shutter during collection, however, does not allow the detector to gain information about the scene.

SUMMARY OF THE DISCLOSURE

In accordance with the present invention, disadvantages and problems associated with previous techniques for reducing signal offset in an infrared camera may be reduced or eliminated.

According to one embodiment, collecting samples to adjust a signal includes providing a shutter in an opened position to allow a detector of an infrared camera to detect infrared radiation and generate a signal corresponding to the radiation. A first touchup iteration is initiated by moving the shutter to a closed position, and samples of a reference frame are collected according to a collection instruction. The shutter is then moved to the opened position. If there is a change in a state of the infrared camera, the collection instruction is adjusted in response to the change. A second touchup iteration is initiated by moving the shutter to the closed position, and samples are collected according to the adjusted collection instruction. A modification of the signal is determined in accordance with at least some of the samples.

Certain embodiments of the invention may provide one or more technical advantages. A technical advantage of one embodiment may be that sample collection may be dynamically adjusted in response to changes at the infrared camera. Dynamically adjusting sample collection may provide for more effective and efficient sample collection.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
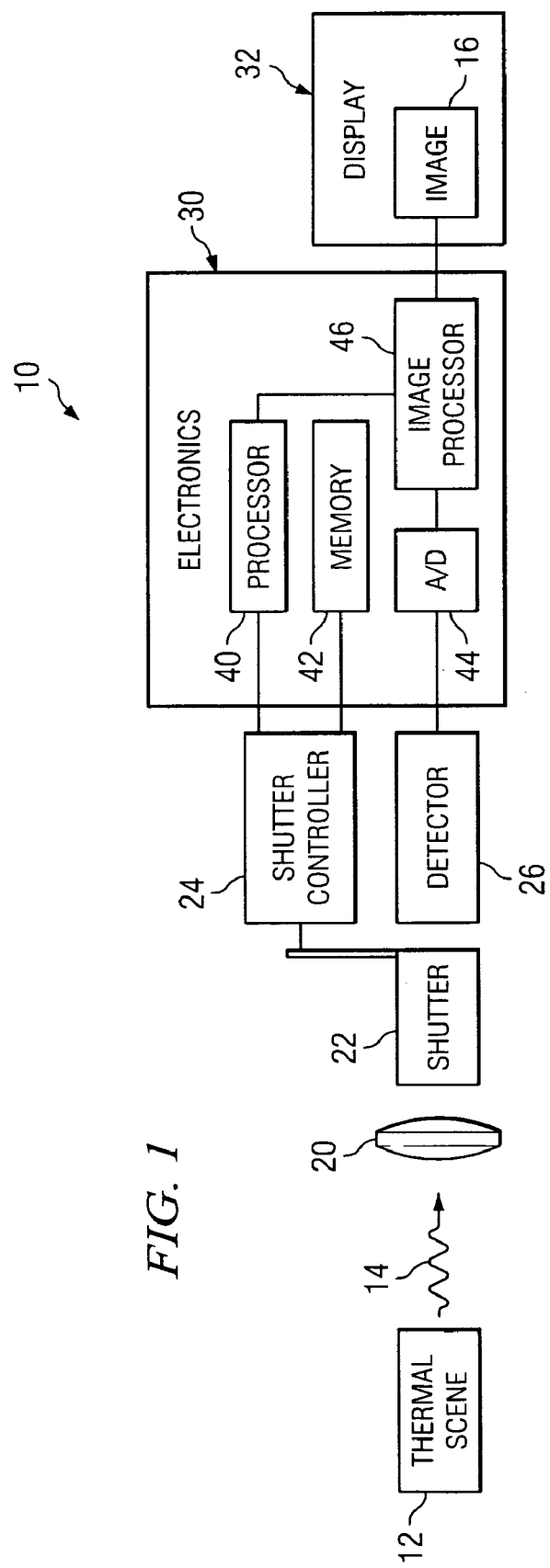
FIG. 1 is a block diagram of one embodiment of a system that may be used in accordance with the present invention.
Figure 2:
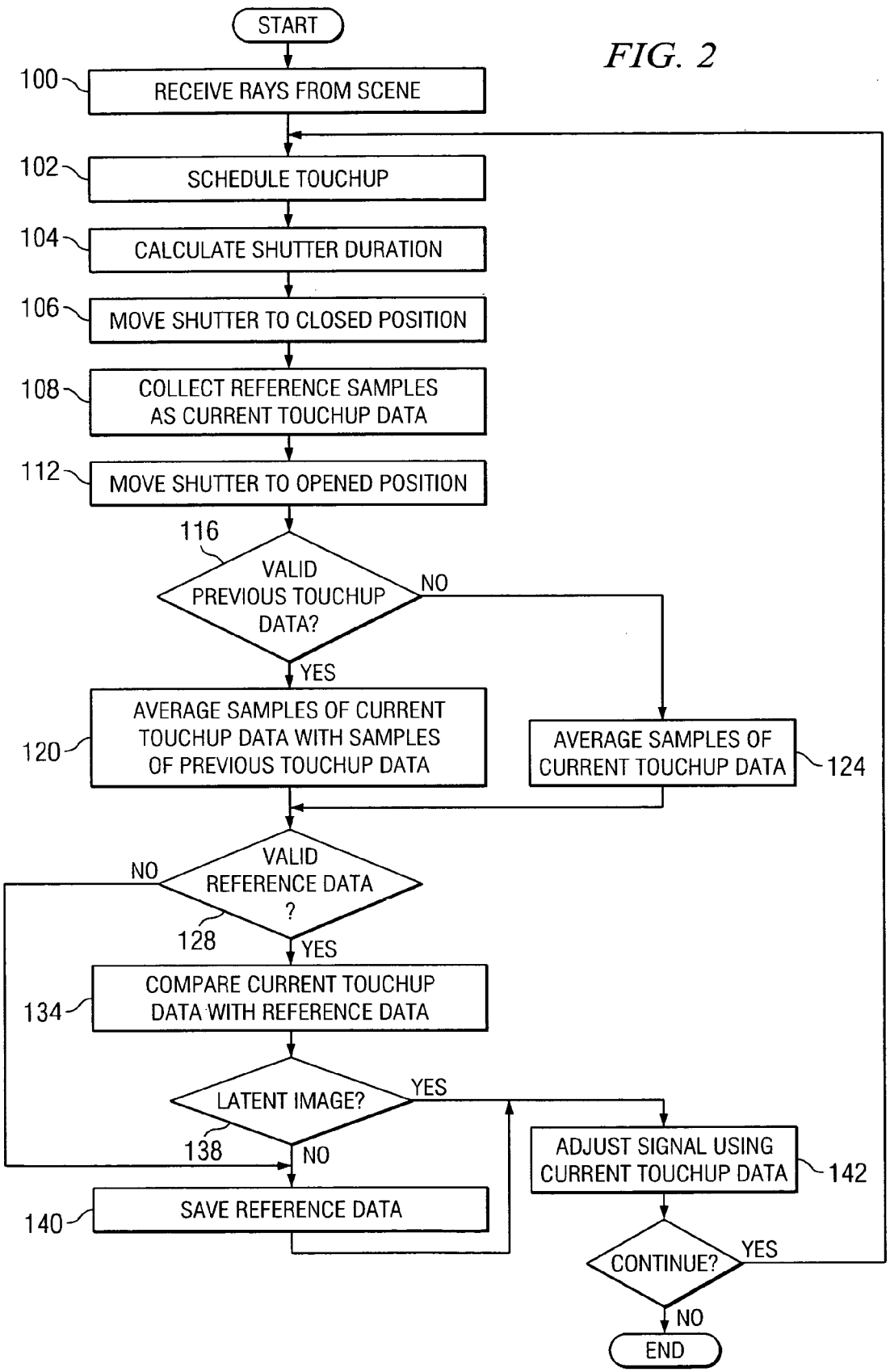
FIG. 2 is a flowchart of one embodiment of a method that may be used in accordance with the present invention.

Embodiments of the present invention and its advantages are best understood by referring to FIGS. 1 and 2 of the drawings, like numerals being used for like and corresponding parts of the various drawings.

FIG. 1 is a block diagram of one embodiment of a system 10 for generating an image of a thermal scene 12. According to the embodiment, system 10 performs a touchup procedure by moving a shutter to block a detector to allow the detector to collect samples of a reference frame. System 10 dynamically controls the collection of samples in response to changes in system 10, which may provide for more effective and efficient sample collection.

Thermal scene 12 includes objects that emit infrared rays 14 that travel to system 10. An infrared ray 14 refers to electromagnetic energy in a band with a wavelength longer than that of visible light, but shorter than that of microwave energy. Rays 14 include thermal information about thermal scene 12. Examples of objects of thermal scene 12 may include a human, a vehicle, a structure, other object that emits infrared rays 14, or any combination of the preceding. Thermal scene 12 may be part of any suitable application such as a fire fighting, surveillance, thermography, security, or automotive application.

System 10 operates as a thermal camera that receives infrared rays 14 and generates an image 16 representative of thermal scene 12 from infrared rays 14. According to the illustrated embodiment, system 10 includes optics 20, a shutter 22, a shutter controller 24, a detector 26, electronics 30, and a display 32 coupled as shown.

Optics 20 directs rays 14 towards detector 26, and may comprise an optical lens. Shutter 22 may be moved to an opened position that allows detector 26 to detect most or all rays 14 from thermal scene 12, and may be moved to a closed position that prevents detector 26 from detecting most or all rays 14. Shutter controller 24 may control the movement of shutter 22 in response to instructions from electronics 30.

Detector 26 detects rays 14 and generates a signal corresponding to rays 14. The signal corresponding to rays 14 includes at least some of the thermal information of rays 14. Detector 26 comprises an array of detecting elements, or pixels, where each element generates image data for thermal scene 12. For example, detector 26 may comprise a microbolometer focal plane array.

Electronics 30 receives the signal from detector 26 and processes the signal to generate image 16 on display 32. According to the illustrated embodiment, electronics 30 includes a processor 40, a memory 42, an analog-to-digital converter (A/D) 44, and an image processor 46. Processor 40 controls the operation of system 10. As used in this document, the term "processor" refers to any suitable device operable to execute instructions and manipulate data to perform operations.

Processor 40 moves shutter 22 by sending instructions to shutter controller 24 to move shutter 22. During a touchup procedure, processor 40 sends sample collection instructions to shutter controller 24 to move shutter 20 to a closed position to allow detector 26 to collect samples of reference frames. A frame may refer to video data for at least most pixels of detector 26. A reference frame may refer to a frame of a constant known scene, such as the scene presented to detector when shutter 22 is in a closed position. A reference sample may refer to a sample of a reference frame.

Sample collection instructions may include a shutter duration describing the amount of time that shutter 22 is in a closed position, a collection time describing an amount of time to collect samples, a settle time describing an amount of time between closing shutter 22 and collecting-samples, a delay time describing the time of the next touchup iteration, other instruction, or any combination of the preceding.

According to one embodiment, processor 40 dynamically adjusts sample collection instructions in response to changes that occur at system 10. Processor 40 may adjust the instructions according to a method described with reference to FIG. 2.

Memory 42 stores and facilitates retrieval of information used by processor 40. The information may include touch-up data and reference data. Valid touch-up data includes samples collected during one or more previous iterations that have not been purged. Valid reference data may refer to the last known valid signal adjustments used to reduce or remove signal offsets. Reference data may be purged in response to a gain transition or a temperature change that exceeds a specific threshold.

Memory 42 may include Random Access Memory (RAM), Read Only Memory (ROM), magnetic drives, disk drives, Compact Disk (CD) Drives, Digital Video Disk (DVD) drives, removable media storage, any other suitable data storage device, or a combination of any of the preceding.

Analog-to-digital converter 44 converts the signal from detector 26 from an analog form to a digital form. Image processor 46 processes the signal to generate image 16. According to one embodiment, image processor uses signal samples collected during sample collection to determine offset adjustments. Image processor 46 may then apply the adjustments to the signal to reduce or remove signal offsets. Display 32 displays image 16. Display 32 may have any suitable shape or size. For example, display 32 may comprise a screen of any suitable size that may be coupled to a computing device. The computing device may have any suitable embodiment, such as a desktop computer, a laptop, a handset, or a headset.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of processor 40 and image processor 46 may be performed by one module, or the operations of image processor 46 may be performed by more than one module. Additionally, operations of system 10 may be performed using any suitable logic comprising software, hardware, other logic, or any suitable combination of the preceding. As used in this document, "each" refers to each member of a set or each member of a subset of a set.

FIG. 2 is a flowchart illustrating one embodiment of a method for reducing signal offset in an infrared camera. The method may be used with any suitable system, for example, system 10 of FIG. 1.

The method begins at step 100, where detector 26 of system 10 receives rays 14 from scene 12. A touchup is scheduled at step 102. The time of the touch-up may be determined according to the state of system 10. The state of system 10 may refer to conditions at system 10 that create signal offsets. For example, a condition may refer to the temperature of detector 26 or other component of system 10. As another example, a condition may refer to the response of detector 26, a gain controller, or other component of system 10 to thermal scene 12. As yet another example, a condition may refer to the detection of a latent image.

A changing state may refer to a state during which conditions, such as the temperature or the response of detector 26, change significantly from frame to frame. An example of a changing state may be an initialization state when the power of system 10 initialized. Another example of a changing state occurs when movement within thermal scene 12 causes variation in the response of detector 26. Yet another example of a changing state occurs when changes of the brightness within thermal scene 12 causes variation in the response of a gain controller. Yet another example of a changing state occurs when environmental or operational factors cause variations in the temperature of system 10. A steady state may refer to a state during which conditions do not change significantly from frame to frame.

Touch-ups may be scheduled more frequently during a changing state than during a steady state to take into account the variation. A delay time may refer to the time period between the movement of shutter 20 to an open position at one iteration and the movement of shutter 20 to a closed position at the next iteration. The next touch-up during a changing state may be scheduled to occur after a delay time of x seconds, and the next touch-up during a steady state may be scheduled to occur after a delay time of y seconds, where x is less than y. Value x may be in the range of 10 to 20 seconds such as approximately 15 seconds, while value y may be in the range of 20 to 40 seconds such as approximately 30 seconds.

A touch-up may be dynamically scheduled in response to a change of a condition. A touch-up may be scheduled to occur after a short delay time in response to a detected change in temperature, gain, or detector 26. For example, a touch-up may be scheduled if the temperature has changed by 10 degrees Celsius. As another example, a touch-up may be scheduled to occur after a short delay time if a latent image is detected.

The shutter duration is calculated at step 104. The shutter duration may refer to the amount of time that shutter 22 is in the closed position. The shutter duration $t_{sd}$ may be expressed by Equation (1):

$$t_{sd} = t_{settle} + t_{collection} + 2 \times t_{shuttertransition} \quad (1)$$

where $t_{settle}$ is the time for detector 26 to settle to a noise equivalent temperature difference (NETD), $t_{collection}$ is the time it takes to collect a predetermined number of frames, and $t_{shuttertransition}$ is the shutter transition time to move shutter 20 from one position to another position and may be approximately 25 milliseconds.

Settle time $t_{settle}$ may be calculated in accordance with the temperature of the pixels of detector 26 as indicated by pixel values. The higher the temperature of the pixels, the longer the settle time. For example, higher temperature pixels may correspond to a settle time of more than 20 milliseconds, while cooler pixels may correspond to a settle time of less than 20 milliseconds. The temperature of the pixels may be calculated using the values of most of the pixels, for example, greater than 90% of the pixels, such as greater than 95% of the pixels. The values of these pixels may be used in a decay time equation to determine the time it would take the pixels to settle to an operating temperature. For example, settle time $t_{settle}$ may be calculated according to Equation (2):

$$t_{settle} = \tau_{th} \ln\left(\frac{1}{\beta} \frac{|T_{scene} - T_{shutter}|}{NETD}\right) \quad (2)$$

where $\tau_{th}$ represents the combined thermal and electrical time constant of the detector, $\beta$ represents the factor relating the desired settling to NETD, $\beta<1$, $T_{scene}$ represents the highest signal temperature in the field of view for most of the pixels, NETD is approximately 0.05 degrees, and $|T_{scene} - T_{shutter}| \geq (NETD \times \beta)$.

Collection time $t_{collection}$ may be calculated in accordance with the state of system 10. A changing state may use a longer collection time such as in the range of 100 to 800 msec, such as approximately 200 msec. A steady state may use a shorter collection time such as in the range of 25 to 100 msec, such as approximately 33 msec. The collection time may also be measured in terms of the number of samples collected. For example, a shorter collection time may correspond to one to four samples, such as approximately one sample, and a longer collection time may correspond to four to sixteen samples, such as approximately eight samples. Collection time $t_{collection}$ may also be calculated in accordance with the detection of a latent image. If a latent image is detected, a longer collection time may be used.

Examples of shutter duration may include approximately 100 milliseconds for a steady state condition where $|T_{scene} - T_{shutter}|$ is substantially equivalent to $NETD \times \beta$, approximately 200 milliseconds for a steady state condition with a scene where $|T_{scene} - T_{shutter}|$ is substantially equivalent to 10° Celsius with $\beta=1$, approximately 250 milliseconds for a steady state condition with a scene where $|T_{scene} - T_{shutter}|$ is substantially equivalent to 600° Celsius with $\beta=1$, and approximately 500 to 600 milliseconds for a dynamic condition with a scene where $|T_{scene} - T_{shutter}|$ is substantially equivalent to 600° Celsius with $\beta=1$.

Shutter 22 is moved to a closed position at step 106. Shutter 22 in the closed position prevents detector 26 from detecting rays 14. Reference samples are collected at step 108. Samples may be collected by electronics 30 through detector 26. The samples may be collected at any suitable interval, for example, at intervals of 16 to 40 milliseconds, such as approximately 33 milliseconds.

Shutter 22 is moved into an opened position at step 112. The method determines if there is previous valid touch-up data at step 116. Valid touch-up data may refer to samples collected during one or more previous iterations and that have not been purged. Processor 40 may check memory 42 to determine if there is previous valid touch-up data.

If there is previous valid touch-up data, the method proceeds to step 120, where the samples of the current touch-up data are combined with the samples of the previous touch-up data. The samples are combined to estimate the fixed noise of the signal. The estimate may be used to determine an adjustment of the signal to reduce or remove the fixed noise.

The samples of the data may be combined in any suitable manner. For example, the samples may be combined by averaging the samples, such as by simply or recursively averaging the samples. The samples of current touch-up data may be combined with the samples of previous touch-up data, by simple or recursive averaging, in order to provide a broader sample of reference frame. Any suitable number of previous samples may be combined with any suitable number of current samples. As an example, a greater number of previous samples may be used if the infrared camera is in a steady state than if the infrared camera is in a changing state. Previous samples may be weighted with respect to the current samples. As an example, previous samples may be given a higher weighting if the infrared camera is in the steady state than if the infrared camera is in the changing state. If there is no previous valid touch-up data at step 116, the method proceeds to step 124, where the samples of current touch-up data are combined.

The method determines if there is valid reference data at step 128. Processor 40 may check memory 42 to determine if there is valid reference data. Valid reference data may refer to the last known valid signal adjustments, and data may be purged in response to a gain transition or a temperature change that exceeds a specific threshold.

If there is valid reference data at step 128, the method proceeds to step 134, where the current touch-up data is compared with the reference data to determine if there is a latent image. For example, processor 40 may do a pixel by pixel comparison of the touch-up data with the reference data to determine if there are any differences between the pixels that indicate a latent image. The method determines if there is a latent image at step 128. Differences may indicate a latent image if the differences exceed a latency correction threshold. Differences that do not exceed the latency correction threshold may be designated as either not indicating a latent image or as indicating a latent image too subtle to correct.

If there is no latent image that needs to be corrected at step 138, the method proceeds to step 140, where reference data is saved. The reference data may be saved in memory 42. If there is a latent image that is to be corrected at step 138, the method proceeds to step 142. Typically, reference data resulting from a latent image is not saved.

The signal is adjusted using the current touch-up data at step 142. For example, image processor 46 may use the touch-up data to adjust the signal to reduce distortion of the signal. If the method is to continue at step 146, the method returns to step 102, where the next touchup is scheduled. If the method is not to continue at step 152, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that sample collection may be dynamically adjusted in response to changes at the infrared camera. Dynamically adjusting sample collection may provide for more effective and efficient sample collection.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for collecting a plurality of samples for adjusting a signal, comprising:

providing a shutter in an opened position to substantially allow a detector of an infrared camera to detect infrared radiation comprising information about a scene;

generating a signal corresponding to the infrared radiation;

initiating a first touchup iteration by moving the shutter to a closed position to substantially prevent the detector from detecting the infrared radiation;

collecting a plurality of first samples of a reference frame according to a collection instruction;

moving the shutter to the opened position to allow the detector to detect the infrared radiation;

establishing that there is a change in a state of the infrared camera from a first state to a second state;

adjusting the collection instruction in response to the change;

initiating a second touchup iteration by moving the shutter to the closed position;

collecting a plurality of second samples of the reference frame according to the adjusted collection instruction; and determining a modification of the signal in accordance with at least one of the first samples and the second samples.

2. The method of claim 1, wherein:

establishing that there is the change in the state of the infrared camera further comprises establishing that the first state is a changing state and the second state is a steady state; and adjusting the collection instruction in response to the change further comprises adjusting a first shutter duration of the first touchup iteration to yield a second shutter duration of the second touchup iteration, the second shutter duration less than the first shutter duration.

3. The method of claim 1, wherein:

establishing that there is the change in the state of the infrared camera further comprises establishing that the first state is a steady state and the second state is a changing state; and adjusting the collection instruction in response to the change further comprises adjusting a first shutter duration of the first touchup iteration to yield a second shutter duration of the second touchup iteration, the second shutter duration greater than the first shutter duration.

4. The method of claim 1, wherein:

establishing that there is the change in the state of the infrared camera further comprises establishing that the first state is a changing state and the second state is a steady state; and adjusting the collection instruction in response to the change further comprises adjusting a first delay time prior to the first touchup iteration to yield a second delay time prior to the second touchup iteration, the second delay time greater than the first delay time.

5. The method of claim 1, wherein:

establishing that there is the change in the state of the infrared camera further comprises establishing that the first state is a steady state and the second state is a changing state; and adjusting the collection instruction in response to the change further comprises adjusting a first delay time prior to the first touchup iteration to yield a second delay time prior to the second touchup iteration, the second delay time less than the first delay time.

6. The method of claim 1, wherein:

establishing that there is the change in the state of the infrared camera further comprises establishing that there is a change in a condition of the infrared camera; and adjusting the collection instruction in response to the change further comprises adjusting a first delay time prior to the first touchup iteration to yield a second delay time prior to the second touchup iteration, the second delay time less than the first delay time.

7. The method of claim 1, wherein:

establishing that there is the change in the state of the infrared camera further comprises establishing that the first state has a lower temperature and the second state has a higher temperature; and adjusting the collection instruction in response to the change further comprises adjusting a first settle time associated with the first touchup iteration to yield a second settle time associated with the second touchup iteration, the second settle time greater than the first settle time.

8. The method of claim 1, wherein:

establishing that there is the change in the state of the infrared camera further comprises establishing that the first state has a higher temperature and the second state has a lower temperature; and adjusting the collection instruction in response to the change further comprises adjusting a first settle time associated with the first touchup iteration to yield a second settle time associated with the second touchup iteration, the second settle time less than the first settle time.

9. The method of claim 1, further comprising:

comparing the modification of the signal to a previous modification;

detecting a latent image in response to the comparison; and scheduling a third touchup iteration to collect a third plurality of samples, the third touch-up iteration having a third delay time less than a second delay time between the first touchup and the second touchup.

10. The method of claim 1, further comprising:

comparing the modification of the signal to a previous modification;

detecting a latent image in response to the comparison; and scheduling a third touchup iteration to collect a third plurality of samples, the number of the third plurality of samples greater than the number of the second plurality of samples.

11. A system for collecting a plurality of samples for adjusting a signal, comprising:

a detector of an infrared camera, the detector operable to:

detect infrared radiation comprising information about a scene; and generate a signal corresponding to the infrared radiation;

a processor operable to:

initiate a first touchup iteration by moving a shutter to a closed position to substantially prevent the detector from detecting the infrared radiation;

collect a plurality of first samples of a reference frame according to a collection instruction;

move the shutter to an opened position to allow the detector to detect the infrared radiation;

establish that there is a change in a state of the infrared camera from a first state to a second state;

adjust the collection instruction in response to the change;

initiate a second touchup iteration by moving the shutter to the closed position;

collect a plurality of second samples of the reference frame according to the adjusted collection instruction; and determine a modification of the signal in accordance with at least one of the first samples and the second samples.

12. The system of claim 11, the processor further operable to:
  establish that there is the change in the state of the infrared camera by establishing that the first state is a changing state and the second state is a steady state; and
  adjust the collection instruction in response to the change by adjusting a first shutter duration of the first touchup iteration to yield a second shutter duration of the second touchup iteration, the second shutter duration less than the first shutter duration.

13. The system of claim 11, the processor further operable to:
  establish that there is the change in the state of the infrared camera by establishing that the first state is a steady state and the second state is a changing state; and
  adjust the collection instruction in response to the change by adjusting a first shutter duration of the first touchup iteration to yield a second shutter duration of the second touchup iteration, the second shutter duration greater than the first shutter duration.

14. The system of claim 11, the processor further operable to:
  establish that there is the change in the state of the infrared camera by establishing that the first state is a changing state and the second state is a steady state; and
  adjust the collection instruction in response to the change by adjusting a first delay time prior to the first touchup iteration to yield a second delay time prior to the second touchup iteration, the second delay time greater than the first delay time.

15. The system of claim 11, the processor further operable to:
  establish that there is the change in the state of the infrared camera by establishing that the first state is a steady state and the second state is a changing state; and
  adjust the collection instruction in response to the change by adjusting a first delay time prior to the first touchup iteration to yield a second delay time prior to the second touchup iteration, the second delay time less than the first delay time.

16. The system of claim 11, the processor further operable to:
  establish that there is the change in the state of the infrared camera by establishing that there is a change in a condition of the infrared camera; and
  adjust the collection instruction in response to the change by adjusting a first delay time prior to the first touchup iteration to yield a second delay time prior to the second touchup iteration, the second delay time less than the first delay time.

17. The system of claim 11, the processor further operable to:
  establish that there is the change in the state of the infrared camera by establishing that the first state has a lower temperature and the second state has a higher temperature; and
  adjust the collection instruction in response to the change by adjusting a first settle time associated with the first touchup iteration to yield a second settle time associated with the second touchup iteration, the second settle time greater than the first settle time.

18. The system of claim 11, the processor further operable to:
  establish that there is the change in the state of the infrared camera by establishing that the first state has a higher temperature and the second state has a lower temperature; and
  adjust the collection instruction in response to the change by adjusting a first settle time associated with the first touchup iteration to yield a second settle time associated with the second touchup iteration, the second settle time less than the first settle time.

19. The system of claim 11, the processor further operable to:
  compare the modification of the signal to a previous modification;
  detect a latent image in response to the comparison; and
  schedule a third touchup iteration to collect a third plurality of samples, the third touch-up iteration having a third delay time less than a second delay time between the first touchup and the second touchup.

20. The system of claim 11, the processor further operable to:
  compare the modification of the signal to a previous modification;
  detect a latent image in response to the comparison; and
  schedule a third touchup iteration to collect a third plurality of samples, the number of the third plurality of samples greater than the number of the second plurality of samples.

21. A system for collecting a plurality of samples for adjusting a signal, comprising:
  means for providing a shutter in an opened position to substantially allow a detector of an infrared camera to detect infrared radiation comprising information about a scene;
  means for generating a signal corresponding to the infrared radiation;
  means for initiating a first touchup iteration by moving the shutter to a closed position to substantially prevent the detector from detecting the infrared radiation;
  means for collecting a plurality of first samples of a reference frame according to a collection instruction;
  means for moving the shutter to the opened position to allow the detector to detect the infrared radiation;
  means for establishing that there is a change in a state of the infrared camera from a first state to a second state;
  means for adjusting the collection instruction in response to the change;
  means for initiating a second touchup iteration by moving the shutter to the closed position;
  means for collecting a plurality of second samples of the reference frame according to the adjusted collection instruction; and
  means for determining a modification of the signal in accordance with at least one of the first samples and the second samples.

22. A method for collecting a plurality of samples for adjusting a signal, comprising:
  providing a shutter in an opened position to substantially allow a detector of an infrared camera to detect infrared radiation comprising information about a scene;
  generating a signal corresponding to the infrared radiation;
  initiating a first touchup iteration by moving the shutter to a closed position to substantially prevent the detector from detecting the infrared radiation;
  collecting a plurality of first samples of a reference frame according to a collection instruction;
  moving the shutter to the opened position to allow the detector to detect the infrared radiation;
  establishing that there is a change in a state of the infrared camera from a first state to a second state;

adjusting the collection instruction in response to the change;

initiating a second touchup iteration by moving the shutter to the closed position;

collecting a plurality of second samples of the reference frame according to the adjusted collection instruction;

determining a modification of the signal in accordance with at least one of the first samples and the second samples;

comparing the modification of the signal to a previous modification;

detecting a latent image in response to the comparison; and scheduling a third touchup iteration to collect a third plurality of samples, the third touch-up iteration having a third delay time less than a second delay time between the first touchup and the second touchup, the number of the third plurality of samples greater than the number of the second plurality of samples, wherein establishing that there is the change in the state of the infrared camera and adjusting the collection instruction in response to the change further comprise performing at least one of the following:

a first procedure comprising:
  establishing that there is the change in the state of the infrared camera further comprises establishing that the first state is a changing state and the second state is a steady state; and
  adjusting the collection instruction in response to the change further comprises:
    adjusting a first shutter duration of the first touchup iteration to yield a second shutter duration of the second touchup iteration, the second shutter duration less than the first shutter duration; and
    adjusting a first delay time prior to the first touchup iteration to yield a second delay time prior to the second touchup iteration, the second delay time greater than the first delay time;

a second procedure comprising:
  establishing that there is the change in the state of the infrared camera further comprises establishing that the first state is a steady state and the second state is a changing state; and
  adjusting the collection instruction in response to the change further comprises:
    adjusting a first shutter duration of the first touchup iteration to yield a second shutter duration of the second touchup iteration, the second shutter duration greater than the first shutter duration; and
    adjusting the collection instruction in response to the change further comprises adjusting a first delay time prior to the first touchup iteration to yield a second delay time prior to the second touchup iteration, the second delay time less than the first delay time;

a third procedure comprising:
  establishing that there is the change in the state of the infrared camera further comprises establishing that there is a change in a condition of the infrared camera; and
  adjusting the collection instruction in response to the change further comprises adjusting a first delay time prior to the first touchup iteration to yield a second delay time prior to the second touchup iteration, the second delay time less than the first delay time;

a fourth procedure comprising:
  establishing that there is the change in the state of the infrared camera further comprises establishing that the first state has a lower temperature and the second state has a higher temperature; and
  adjusting the collection instruction in response to the change further comprises adjusting a first settle time associated with the first touchup iteration to yield a second settle time associated with the second touchup iteration, the second settle time greater than the first settle time; and a fifth procedure comprising:
  establishing that there is the change in the state of the infrared camera further comprises establishing that the first state has a higher temperature and the second state has a lower temperature; and
  adjusting the collection instruction in response to the change further comprises adjusting a first settle time associated with the first touchup iteration to yield a second settle time associated with the second touchup iteration, the second settle time less than the first settle time.

23. A method for collecting a plurality of samples for adjusting a signal, comprising:

providing a shutter in an opened position to substantially allow a detector of an infrared camera to detect infrared radiation comprising information about a scene;

generating a signal corresponding to the infrared radiation;

initiating a first touchup iteration by moving the shutter to a closed position to substantially prevent the detector from detecting the infrared radiation;

collecting a plurality of first samples of a reference frame according to a collection instruction;

moving the shutter to the opened position to allow the detector to detect the infrared radiation;

initiating a second touchup iteration by moving the shutter to the closed position;

collecting a plurality of second samples of the reference frame according to the adjusted collection instruction; and determining a modification of the signal in accordance with the first samples and the second samples.

24. The method of claim 23, wherein determining the modification further comprises:
  establishing whether the infrared camera is in a steady state or a changing state; and
  using a greater number of first samples if the infrared camera is in the steady state than if the infrared camera is in the changing state.

25. The method of claim 23, wherein determining the modification further comprises:
  establishing whether the infrared camera is in a steady state or a changing state; and
  weighting the first samples with a higher weight if the infrared camera is in the steady state than if the infrared camera is in the changing state.

26. The method of claim 23, wherein determining the modification further comprises subtracting a plurality of processed reference frames from a plurality of signal frames.

27. The method of claim 23, wherein determining the modification further comprises:
  calculating a weighted average of the first samples and the second samples; and determining the modification according to the weighted average.

28. The method of claim 23, wherein determining the modification further comprises:
   calculating an average of the second samples; and
   determining the modification according to the average.

29. The method of claim 23, wherein determining the modification further comprises:
   calculating a first weighted average of the second samples according to a first weighting factor; and
   calculating a second weighted average of the first weighted average and a previous modification according to a second weighting factor.

30. The method of claim 23, wherein determining the modification further comprises:
   calculating a first weighted average of the second samples according to a first weighting factor;
   determining a difference between the first weighted average and a previous modification to yield a second weighting factor; and
   calculating a second weighted average of the first weighted average and the previous modification according to the second weighting factor.

31. A system for collecting a plurality of samples for adjusting a signal, comprising:
   a detector of an infrared camera, the detector operable to:
      detect infrared radiation comprising information about a scene; and
      generate a signal corresponding to the infrared radiation;
   a processor operable to:
      provide a shutter in an opened position to substantially allow a detector of the infrared camera to detect the infrared radiation;
      initiate a first touchup iteration by moving the shutter to a closed position to substantially prevent the detector from detecting the infrared radiation;
      collect a plurality of first samples of a reference frame according to a collection instruction;
      move the shutter to the opened position to allow the detector to detect the infrared radiation;
      initiate a second touchup iteration by moving the shutter to the closed position;
      collect a plurality of second samples of the reference frame according to the adjusted collection instruction; and
      determine a modification of the signal in accordance with the first samples and the second samples.

32. The system of claim 31, wherein the processor is operable to determine the modification by:
   establishing whether the infrared camera is in a steady state or a changing state; and
   using a greater number of first samples if the infrared camera is in the steady state than if the infrared camera is in the changing state.

33. The system of claim 31, wherein the processor is operable to determine the modification by:
   establishing whether the infrared camera is in a steady state or a changing state; and
   weighting the first set with a higher weight if the infrared camera is in the steady state than if the infrared camera is in the changing state.

34. The system of claim 31, wherein the processor is operable to determine the modification by subtracting a plurality of processed reference frames from a plurality of signal frames.

35. The system of claim 31, wherein the processor is operable to determine the modification by:
   calculating a weighted average of the first samples and the second samples; and
   determining the modification according to the weighted average.

36. The system of claim 31, wherein the processor is operable to determine the modification by:
   calculating an average of the second samples; and
   determining the modification according to the average.

37. The system of claim 31, wherein the processor is operable to determine the modification by:
   calculating a first weighted average of the second samples according to a first weighting factor; and
   calculating a second weighted average of the first weighted average and a previous modification according to a second weighting factor.

38. The system of claim 31, wherein the processor is operable to determine the modification by:
   calculating a first weighted average of the second samples according to a first weighting factor;
   determining a difference between the first weighted average and a previous modification to yield a second weighting factor; and
   calculating a second weighted average of the first weighted average and the previous modification according to the second weighting factor.

* * * * *